United States Patent
Montgomery

(10) Patent No.: US 12,516,876 B2
(45) Date of Patent: Jan. 6, 2026

(54) CRYOGENIC CONTAINMENT SYSTEM

(71) Applicant: Caterpillar Inc., Peoria, IL (US)

(72) Inventor: David T. Montgomery, Edelstein, IL (US)

(73) Assignee: Caterpillar Inc., Peoria, IL (US)

( * ) Notice: Subject to any disclaimer, the term of this patent is extended or adjusted under 35 U.S.C. 154(b) by 1069 days.

(21) Appl. No.: 17/495,764

(22) Filed: Oct. 6, 2021

(65) Prior Publication Data

US 2023/0108882 A1 Apr. 6, 2023

(51) Int. Cl.
*F25J 1/00* (2006.01)
*F17C 6/00* (2006.01)
*F17C 13/02* (2006.01)

(52) U.S. Cl.
CPC ............ *F25J 1/0025* (2013.01); *F17C 6/00* (2013.01); *F17C 13/02* (2013.01); *F17C 2205/0323* (2013.01); *F17C 2221/012* (2013.01); *F17C 2223/0161* (2013.01); *F17C 2250/043* (2013.01); *F17C 2265/031* (2013.01); *F25J 2245/90* (2013.01)

(58) Field of Classification Search
CPC ........ F25J 1/0025; F25J 2245/90; F17C 6/00; F17C 13/02; F17C 2205/0323; F17C 2221/012; F17C 2223/0161; F17C 2250/043; F17C 2265/031
USPC ........................................................ 62/48.2
See application file for complete search history.

(56) References Cited

U.S. PATENT DOCUMENTS

| | | | |
|---|---|---|---|
| 4,386,309 A | 5/1983 | Peschka | |
| 5,728,483 A | 3/1998 | Fujitani et al. | |
| 6,125,637 A | 10/2000 | Bingham et al. | |
| 6,202,710 B1 * | 3/2001 | Dill | B60L 58/30 141/285 |
| 6,314,978 B1 * | 11/2001 | Lanning | F17C 9/00 137/256 |
| 6,907,735 B2 | 6/2005 | Wolff et al. | |

(Continued)

FOREIGN PATENT DOCUMENTS

| | | |
|---|---|---|
| DE | 102017011349 A1 | 6/2018 |
| DE | 102018000692 A1 | 8/2018 |
| WO | 2016081900 A1 | 5/2016 |

OTHER PUBLICATIONS

Written Opinion and International Search Report for Int'l. Patent Appln. No. PCT/US2022/044788, mailed Jan. 10, 2023 (8 pgs).

*Primary Examiner* — Joel M Attey
(74) *Attorney, Agent, or Firm* — Lee & Hayes, PLLC

(57) ABSTRACT

A cryogenic fluid containment system is disclosed. The system can store a fluid such as hydrogen at a cryogenic temperature and pressure. As the fluid naturally warms, boil-off fluid is produced by the fluid and can be directed to a backup power system that is configured to consume the boil-off fluid. The boil-off fluid being extracted from the cryogenic fluid containment system causes additional boil-off fluid to be generated from the fluid and refrigerate the fluid within the cryogenic fluid containment system. Additionally, the boil-off fluid can be monitored over time such that as the boil-off fluid accumulates within the storage tank, a boil-off controller can determine whether the boil-off fluid is to be extracted from the storage tank. The boil-off controller can enable the fluid to be maintained below a pressure threshold within the storage tank.

11 Claims, 6 Drawing Sheets

(56) References Cited

U.S. PATENT DOCUMENTS

| | | | |
|---|---|---|---|
| 7,690,208 B2 | 4/2010 | Immel | |
| 9,255,664 B2 | 2/2016 | Gerstler et al. | |
| 2004/0107706 A1* | 6/2004 | Reese | F17C 3/10 |
| | | | 62/45.1 |
| 2005/0115248 A1* | 6/2005 | Koehler | F17C 1/002 |
| | | | 141/82 |
| 2014/0157796 A1 | 6/2014 | Drube et al. | |
| 2014/0174083 A1* | 6/2014 | Gerstler | F17C 9/04 |
| | | | 60/671 |

* cited by examiner

CRYOGENIC CONTAINMENT SYSTEM

TECHNICAL FIELD

The present disclosure relates to systems and methods for handling fluids at cryogenic temperatures and pressures. More specifically, the present disclosure relates to systems and methods for reducing or eliminating boil-off waste.

BACKGROUND

Large-scale facilities such as data centers consume large amounts of energy and require backup equipment to ensure there is enough power to complete essential tasks in the event of power loss. Conventionally, diesel generator sets or "gensets" are used to provide backup power to large-scale facilities. Increasingly, Hydrogen ($H_2$) fuel cells and engines are being considered for this purpose, but they present their own challenges. The fuel for such engines is stored at cryogenic temperatures and pressures until the backup power is needed. Cryogenic fluids are typically stored in tanks that passively maintain the stored fluids at extremely cold temperatures. In most cases it is considered inefficient to actively cool the fluids stored within such passive storage tanks, and as a result, other systems are often used to cool these fluids before they are put into the tanks. Passive storage tanks are of course imperfect, and the cryogenic fluid stored within such tanks will warm and increase in pressure gradually over time. When such warming occurs, at least some of the stored $H_2$ will need to be released as "boil-off" in order to maintain safe pressure in the tanks. It should be noted that boil-off refers to the natural process where an amount of cryogenic fluid changes from a liquid phase to a gas phase as the temperature inside the storage tank rises. In some conventional systems, the amount of cryogenic fluid that experiences the phase change from liquid to gas provides the passive cooling of the cryogenic fluid as the latent heat of vaporization absorbs thermal energy within the system. As this happens, the gas generated via boil-off can be vented into the atmosphere to maintain safe storage pressures. In some cases, $H_2$ may boil-off at a rate of up to 1% per day, meaning that without a way to address the boil-off, the $H_2$ will need to be completely replaced approximately every 100 days.

One system for converting a boil-off stream of a cryogenic fluid is disclosed in U.S. Pat. No. 6,907,735 (hereinafter referred to as "the '735 reference"). The '735 reference discloses extracting a boil-off stream from a storage tank, storing the boil-off stream within a buffer tank, and then utilizing the stored boil-off to generate power. As explained in the '735 reference, the buffer tank is utilized to temporarily store the hydrogen gas that comprises the boil off stream until it is used by a hydrogen conversion device to generate power. The '735 reference discloses a system that includes a buffer tank to contain the hydrogen gas of the boil off stream until it can be utilized to generate power and/or be vented to atmosphere Although the system described in the '735 reference may be configured to store the hydrogen gas of the boil-off stream, the system requires the use of multiple components dedicated to storing the boil off stream until the hydrogen conversion device can be utilized to consume the hydrogen gas or the hydrogen gas can be vented to atmosphere. Such components increase the cost and complexity of the system. Additionally, such components are utilized to store the hydrogen gas separate from the liquid hydrogen that generates the boil-off stream. Thus, the system described in the '735 reference, and other similar systems, are continuously collecting the boil-off stream for storage in a separate system, incurring elevated maintenance costs associated with repairing and/or replacing the additional components. Additionally, the system described in the '735 reference also suffers from inefficiencies related to the lack of self-refrigeration due to the boil-off stream being stored separate from the liquid hydrogen.

Examples of the present disclosure are directed toward overcoming one or more of the deficiencies noted above.

SUMMARY OF THE INVENTION

Examples of the present disclosure are directed to a cryogenic hydrogen containment system that includes a tank configured to store hydrogen in a cryogenic state, a liquefaction system configured to receive hydrogen from an external source and to liquify the hydrogen to a desired temperature, a boil-off system configured to maintain the internal temperature and pressure of the tank, and one or more controllers that coordinate the maintenance of the liquid hydrogen. The liquefaction system may have a non-Joule-Thomson cooling stage and one or more Joule-Thomson cooling stages. The hydrogen is treated serially by the non-Joule-Thomson cooling stage then the Joule-Thomson cooling stages. The system can also have a boil-off loop configured to direct hydrogen from the tank to a Joule-Thomson cooling stage of the liquefaction system wherein the hydrogen is treated using Joule-Thomson cooling techniques and is then returned to the tank.

Further examples of the present disclosure are directed to a system including a tank configured to store a fluid in a cryogenic state, and a liquefaction system configured to receive the fluid and to treat the fluid to reach the cryogenic state and to discharge the fluid into the tank. The liquefaction system comprises a first set of stages and a second set of stages. The system also includes a boil-off system comprising a conduit between the tank and the second set of stages. The second set of stages is configured to treat the fluid to reach the liquid phase and to return the fluid to the tank.

Still further examples of the present disclosure are directed to a method of maintaining cryogenic hydrogen. The method includes monitoring a temperature and/or pressure of hydrogen, and if the temperature and/or pressure of the hydrogen reaches a predetermined elevated temperature and/or pressure and a Joule-Thomson coefficient of the hydrogen is positive, the method includes directing gaseous hydrogen from the top of the tank to a liquefaction system. The liquefaction system has a first stage configured to execute non-Joule-Thomson cooling techniques and subsequent stages configured to execute Joule-Thomson cooling techniques. Directing the gaseous hydrogen from the tank to the liquefaction system comprises directing the hydrogen to the final stages of the liquefaction system where the saturated, or near saturated gaseous hydrogen is liquified. The hydrogen is then returned to the tank.

DETAILED DESCRIPTION

Figure 1:
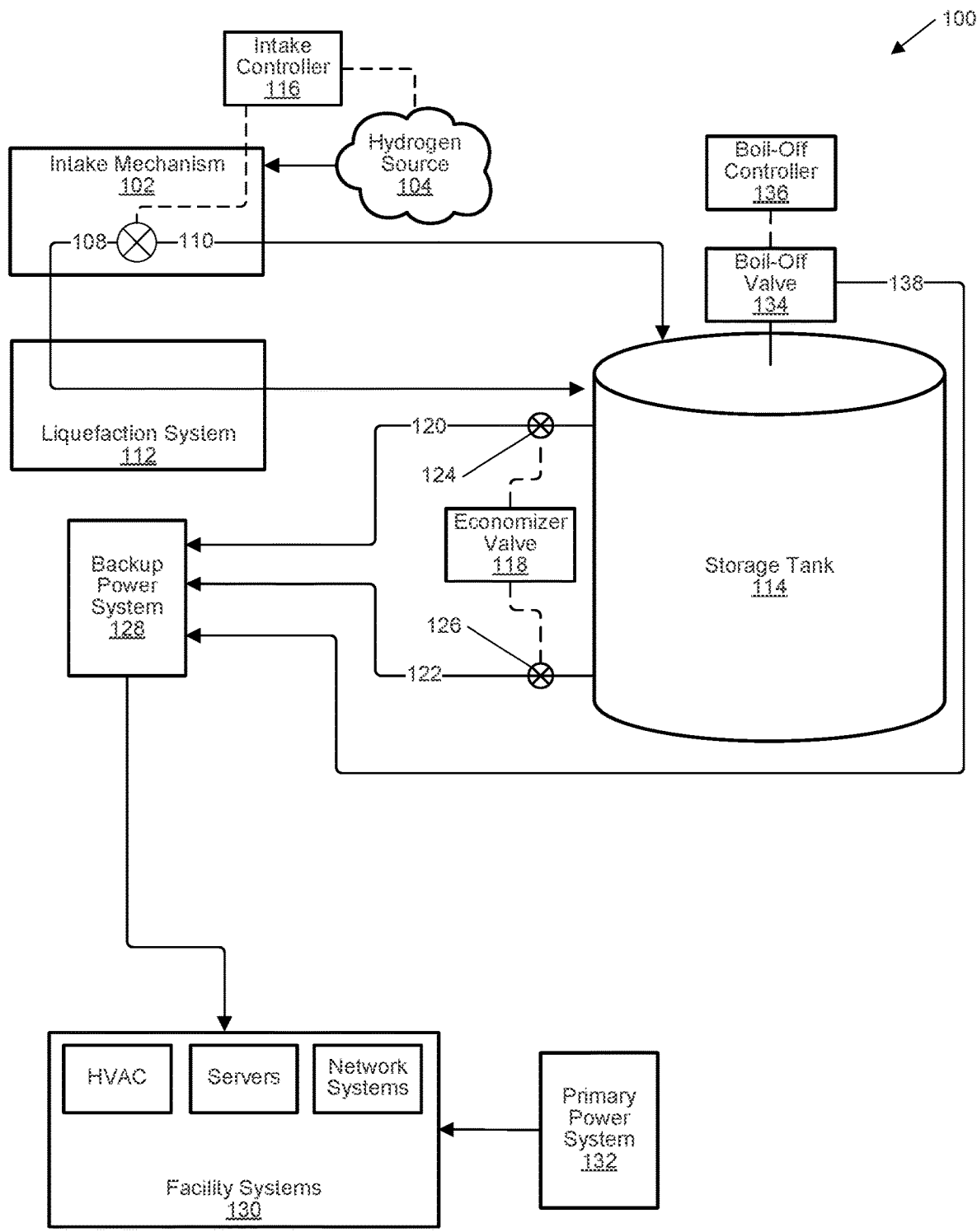
FIG. 1 is a schematic illustration of a cryogenic fluid management system that stores and maintains a cryogenic fluid to fuel a back-up power system for a large-scale facility according to examples of the present disclosure.

FIG. 1 is a schematic illustration of a cryogenic fluid boil-off mitigation system 100 according to embodiments of the present disclosure. The cryogenic fluid boil-off mitigation system 100 can be used with any fluid in any phase or combination of phases and at a variety of temperatures and pressures depending on the particular application of the fluid and the type of fluid as each case may require. Hydrogen is one such fluid that can be stored and maintained by the cryogenic fluid boil-off mitigation system 100. It is to be appreciated that other fluids may also be used with the cryogenic fluid boil-off mitigation system 100 according to the present disclosure and that any specific reference to hydrogen does not limit the scope of the present disclosure to any fluid type. For example, cryogenic fluids can include methane, carbon dioxide, nitrogen helium, noble gases, and other elements/compounds.

Hydrogen can present certain challenges for storage: it is volatile, and the liquification temperature is low (approximately 33 degrees Kelvin). As such, it can be difficult to maintain the hydrogen in a safe, efficient way so that it can be used as fuel or in other applications. Naturally, in any storage system there is a tendency for the hydrogen to warm and even vaporize. As this happens, an internal pressure of a tank increases and, if left unchecked, will exceed containment measures. Accordingly, the internal pressure can cause the tank to rupture and lead to damage to the surround facility, equipment, personnel, and/or assets. In some cases, the vaporized hydrogen can be extracted from the tank to cool the stored hydrogen and maintain pressure levels. More specifically, the cryogenic fluid boil-off mitigation system 100 can mitigate the losses associated with venting the stored hydrogen (or cryogenic fluid) to the atmosphere by extracting the vaporized hydrogen for power generation.

The boil-off mitigation system 100 can receive the hydrogen via an intake mechanism 102 that couples to or is otherwise provided hydrogen from a hydrogen source 104. Additionally, the boil-off mitigation system 100 can include a diverter valve 106 configured to control the distribution of hydrogen from the hydrogen source 104 within the boil-off mitigation system 100. The diverter valve 106 can direct the hydrogen, via a first line 108 and/or a second line 110, to a liquefaction system 112 and/or a storage tank 114. It should be noted that the liquefaction system 112 can include a plurality of cooling stages, such as a first cooling stage and a second cooling stage that may each include one or more cooling systems. Further, the diverter valve 106 can be controlled by an intake controller 116 that regulates incoming hydrogen from the hydrogen source 104 and routes the incoming hydrogen to one or more destinations. The one or more destinations may include the liquefaction system 112 and the storage tank 114. Similarly, an economizer valve 118 can be configured to regulate extraction of the hydrogen from the storage tank 114 via a gaseous line 120 and a liquid line 122 that are regulated via a gaseous valve 124 and a liquid valve 126 that provide the hydrogen to the backup power system 128. Accordingly, the hydrogen (or another cryogenic fluid) can be stored for utilization by a backup power system 128 in the event that power demands associated with facility systems 130 cannot be satisfied by a primary power system 132.

The intake mechanism 102 can be any suitable mechanism by which hydrogen (or another cryogenic fluid) can be injected into and/or received by the cryogenic fluid boil-off mitigation system 100. In some examples, the hydrogen source 104 can include a delivery truck, a delivery pipeline, or any other suitable delivery means from an external hydrogen source. Additionally, the intake mechanism 102 can include valves, flanges, connectors, couplings, and other fastening means that enable the cryogenic fluid boil-off mitigation system 100 to be fluidly connected to the hydrogen source 104. Further, the intake mechanism can include temperature sensors (e.g., thermocouples, thermometers, etc.), pressure sensors (e.g., absolute pressure, gauge pressure, differential pressure, etc.), flow sensors (e.g., velocity flow, mass flow, etc.), and other sensors configured to identify physical properties of the incoming hydrogen. Similarly, the intake mechanism can include regulation systems for controlling the pressure and flow of hydrogen into the cryogenic fluid boil-off mitigation system 100 such as pumps (e.g., mechanisms configured to cause fluid flow, generate pressure differentials, and otherwise apply work to the fluid), control valves (e.g., valves that are configured to open to permit fluid flow and close to restrict fluid flow in response to a received signal and/or an applied force), throttling valves (e.g., valves that are utilize to control fluid flow rates and system pressure), and other pressure control and flow control systems. In some additional examples, the hydrogen received from the hydrogen source 104 can be in a mixed phase solution, in a gaseous state, or in a liquid state. Accordingly, the intake mechanism 102 can be configured to handle input fluids associated different phase states, to separate the gaseous phase from the liquid phase, and to route different phase states to the appropriate portion of the boil-off mitigation system 100. In some further examples, the hydrogen source 104 can be a hydrolysis process (e.g., a chemical process where water is reacted with a substance to produce at least hydrogen), an electrolysis process (e.g., a process where an electrical current is utilized to split water into hydrogen and oxygen), and/or other hydrogen generation processes. In some hydrolysis reactions, the substance and the water can react such that a target molecule of the hydrolysis (or a parent molecule) gains a hydrogen ion. Additionally, hydrogen can be produced by the chemical reaction and supplied to the intake mechanism 102. It should be noted that the intake mechanism 102 can receive hydrogen in any form and facilitate input into the cryogenic fluid boil-off mitigation system 100.

The diverter valve 106 can be controlled, either remotely via electronic inputs or directly via servos/motors, by an intake controller 116. The diverter valve can be configured to control fluid flowing between an input connector (e.g., pipe, hose, tube, etc.) and one or more output connectors. As noted above, one or more sensors (e.g., temperature sensor(s), pressure sensor(s), and flow sensor(s) that are components of the intake mechanism 102) can generate one or more signals associated with physical properties of the hydrogen received from the hydrogen source 104. The one or more signals can be transmitted to the intake controller 116 and utilized for the regulation and routing of the hydrogen to the first line 108 and/or the second line 110. Alternatively, or in addition, the intake mechanism 102 can involve a delivery service such as a vendor of hydrogen that provides the hydrogen at a known pressure and a known temperature. In some examples, the intake controller 116 can be configured to monitor the temperature and the pressure of the hydrogen to determine the phase state of the hydrogen. The intake controller 116 can monitor an input temperature and an input pressure of the hydrogen relative to phase information associated with the hydrogen. In particular, the intake controller 116 can determine that gaseous hydrogen is to be routed to the liquefaction system 112 before being provided to the storage tank 114 via the first line 108 while liquid hydrogen is routed to the storage tank via the second line 110. Additionally, the first line 108 and the second line 110 can pass the hydrogen through cooling systems (e.g., refrigeration systems, heat exchangers, etc.) and pressurizing systems (e.g., pumps, compressors, etc.) such that the hydrogen is provided to the storage tank 114. Accordingly, the intake controller can determine, based at least on the input temperature and the input pressure, whether the hydrogen is to be provided via the first line 108 and/or the second line 110 for storage within the storage tank 114.

In some examples, the intake controller 116 can be configured to monitor the input temperature and the input pressure relative to one or more temperature thresholds associated with the hydrogen. In particular, the liquefaction system 112 may include a plurality of liquefaction methods that are capable of liquefying the hydrogen independently or in sequence based at least on the input temperature and the input pressure. For example, an inversion temperature can indicate a temperature value (at a pressure value) below which expanding hydrogen causes the hydrogen to be cooled and above which expanding hydrogen causes the hydrogen to be heated. Additionally, below the inversion temperature, Joule-Thompson cooling processes may be utilized by the liquefaction system 112. Further, the intake controller 116 can determine that the input temperature is less than the inversion temperature and cause the hydrogen provided to the liquefaction system 112 via the first line 108 to be cooled via Joule-Thompson processes. Alternatively, the intake controller 116 can determine that the input temperature is greater than the inversion temperature and cause the hydrogen to be cooled below the inversion temperature prior to being provided to Joule-Thompson processes. Accordingly, the intake controller 116 can determined, based at least on one or more temperature thresholds, routing for the hydrogen via the first line 108, the second line 110, and/or the liquefaction system 112. It should be noted that while the diverter valve 106 is illustrated as having the first line 108 and the second line 110 as outputs, additional output lines can be included for managing the input temperature of the hydrogen before it is provided to the storage tank.

In some additional examples, the intake controller 116 can cause the diverter valve 106 to regulate and route the hydrogen received from the hydrogen source 104 via the first line 108, the second line 110, and/or any additional lines based at least on one or more temperature thresholds, one or more pressure thresholds, one or more flow thresholds, or a combination of the various thresholds. In particular, the input temperature and the input pressure associated with the hydrogen received from the hydrogen source can be utilized by the intake controller 116 to determine the thermal energy associated with the hydrogen and/or the amount of work required to cool the hydrogen from the input temperature and the input pressure of the hydrogen source 104 to the storage temperature and the storage pressure of the storage tank 114. Accordingly, the intake controller 116 can cause the hydrogen received from the hydrogen source 104 to receive initial cooling of the hydrogen before being provided to the liquefaction system, pressurization for input into the storage tank, and other temperature and/or pressure modifications such that the hydrogen can be provided to the storage tank 114.

The boil-off mitigation system 100 can include a liquefaction system 112. In particular, the liquefaction system 112 can include various components that reduce a temperature and/or increase a pressure of cryogenic fluids provided to the liquefaction system 112 at different temperatures, pressures, and/or states. In the example shown, the liquefaction system 112 can include cooling processes that reduce the input temperature of the hydrogen below a temperature threshold and liquefaction processes that liquify the hydrogen for input into the storage tank 114. As noted in the above example, the cooling processes can utilize non-Joule-Thomson effect and/or Joule-Thomson cooling techniques (where the input temperature is below an inversion point) to reduce the input temperature of the hydrogen the temperature threshold and/or a pressure threshold associated with the liquefaction processes. In some examples, the temperature threshold and/or a pressure threshold can be determined based at least on the inversion temperature of the cryogenic fluid (e.g., hydrogen), the storage temperature or the storage pressure of the storage tank 114, a boil-off temperature and a boil-off pressure associated with the storage tank 114, or other determined temperature and pressure associated with the boil-off mitigation system 100.

In some examples, non-Joule-Thomson cooling techniques can include any refrigeration cycle capable of reducing the temperature of a fluid (e.g., gas, liquid, etc.) or non-cyclic refrigeration techniques. Refrigeration cycles can include vapor-compression cycles, absorption cycles, adsorption cycles, and other refrigeration techniques that cyclically utilize work to remove thermal energy from the system (e.g., cool the hydrogen received from the hydrogen source 104). Alternatively, or in addition, non-cyclic refrigeration involves the utilization of a working fluid that is dispersed or discarded after cooling (e.g., liquid nitrogen is relatively cheap and can be vented to atmosphere after utilization for refrigeration). As noted above, cooling processes can utilize non-Joule-Thomson techniques to cool the hydrogen received from the hydrogen source 104. Such techniques can utilize a heat exchanger having different fluids in various flow pathways that are brought into thermal contact with one another to transfer heat from one fluid to the other (optionally in a cyclic refrigeration system or non-cyclic refrigeration system). Some example types of heat exchangers are shell and tube heat exchangers, plate heat exchangers, plate and shell heat exchangers, adiabatic wheel heat exchangers, pillow plate hear exchangers, fluid heat exchangers, and dynamic scraped surface heat exchangers.

In some examples, Joule-Thomson cooling techniques can be utilized to cool the hydrogen and/or generate liquid hydrogen from the hydrogen via the liquefaction system. The Joule-Thomson effect (also known as the Joule-Kelvin effect or Kelvin-Joule effect) describes the temperature change of a real gas or liquid (as differentiated from an ideal gas) when it is forced through a valve or porous plug while keeping it insulated so that no heat is exchanged with the environment (e.g., the cryogenic fluid undergoes an adiabatic or substantially adiabatic expansion). This procedure is called a throttling process or Joule-Thomson process. At room temperature, most gases cooled upon expansion by Joule-Thomson techniques. However, and as noted above, some gases, such as hydrogen, helium, and neon have an inversion temperature below room temperature that causes them to heat upon expansion until the temperature of the gas is lowered below the inversion temperature. Accordingly, Joule-Thomson techniques can be used for hydrogen, helium, and neon once cooled below the inversion temperature. There are many ways to achieve the desired Joule-Thomson cooling, including nozzles, valves, or porous plugs and the liquefaction system 112 can include any number of these techniques. Accordingly, the liquefaction system can include multiple cooling operations configured as stages to step down the input temperature. In some examples, the liquefaction system can include multiple redundant cooling operations and, depending on the amount of hydrogen to be cooled, some portion of the liquefaction system 112 can be employed while another portion is idle.

In some examples, FIG. 1 is an illustration of the boil-off mitigation system 100 for a facility according to examples of the present disclosure. In particular, the boil-off mitigation system 100 can be configured to maintain a cryogenic fluid (e.g., hydrogen) that can be utilized as a fuel by a backup power system 128. Additionally, the boil-off mitigation system 100 can be configured to prevent venting of boil-off fluid from the storage tank 114 by collecting the boil-off fluid from the storage tank 114, activating the backup power system 128, and providing the boil-off fluid to the backup power system 128 for consumption. Further, the boil-off mitigation system 100 can be configured to maintain the cryogenic fluid as a power reserve in the event that power demands of facility systems 130 is not met by a primary power system 132. In some additional examples, the primary power system 132 can be grid electricity from a local municipality or another standard source of primary power. Additionally, the facility systems 130 can be associated with a power demand that is determined based at least on the power consumed by various systems within the facility. Accordingly, the power demand can include the power requirements of any and all powered HVAC systems, lights, heating systems, cooling systems, motors, engines, networks, servers, other computing devices, and virtually any other mechanism that consumes electrical power within the facility.

In some additional examples, the boil-off mitigation system 100 can manage the cryogenic fluid for the backup power system 128 in the event of a power failure, shortage, or other circumstance that results in power demands of the facility systems 130 not being satisfied by the primary power system 132. In some examples, the backup power system 128 can include hydrogen-powered engine(s) and/or fuel cell(s) that convert hydrogen (or other cryogenic fuels) into sufficient energy to satisfy the power demands of the facility systems 130. Accordingly, upon determining that power demands are not being satisfied by the primary power system 132, the facility and/or the backup power system 128 can cause hydrogen to be extracted from the storage tank 114 and consumed to produce additional power for the facility systems 130.

In some examples, an economizer valve 118 can be configured to supply the cryogenic fluid (e.g., hydrogen) from the storage tank 114 to the backup power system 128 when the power demands of the facility systems 130 is not satisfied by the primary power system 132. In particular, the economizer valve 118 can include the gaseous line 120 and the liquid line 122 that are regulated by the gaseous valve 124 and the liquid valve 126 respectively. It should be noted that the economizer valve 118 is configured to regulate whether the backup power system 128 receives the cryogenic fluid as in a gaseous phase or in a liquid phase. Additionally, the economizer valve 118 can be configured to regulate the cryogenic fluid while the storage tank 114 is discharging the cryogenic fluid for consumption while the power demand of the facility systems 130 is being satisfied by the backup power system 128.

In some additional examples, the economizer valve 118 can be configured such that the storage pressure of the storage tank 114 is utilized to modify whether the cryogenic fluid is provided in the liquid phase or the gaseous phase. In particular, the economizer valve 118 can include an internal pressure component (e.g., an internal spring, actuator, gauge, etc.) that is in fluid communication with the storage tank 114 and is associated with a pressure threshold. The internal pressure component can be configured such that, where the storage pressure exceeds the pressure threshold, the internal pressure component is activated to block the liquid line 122 via the liquid valve 126. Similarly, the internal pressure component can be configured such that, where the storage pressure is less than the pressure threshold, the internal pressure component blocks the gaseous line 120 via the gaseous valve 124. For example, the internal pressure component can be configured as a pressure cylinder that includes a cylinder head that is exposed to the storage pressure and a spring, coupled to the cylinder head, that is configured to be compressed where the storage pressure exceeds the pressure threshold and to extend where the storage pressure is less than the pressure threshold. The cryogenic fluid within the storage tank 114 exerts the storage pressure on the cylinder head, causing the spring to compress or extend. Additionally, compression of the spring (indicating that the storage pressure exceeds the pressure threshold) can cause the gaseous valve 124 to prevent the hydrogen from passing through the gaseous line 120. Similarly, extension of the spring (indicating that the storage pressure is less than the pressure threshold) can cause the liquid valve 126 to prevent the hydrogen from passing through the liquid line 122. It should be noted that the gaseous valve 124 and the liquid valve 126 may be closed by the cylinder head blocking the gaseous line 120 or the liquid line 122, respectively, due to a position of the cylinder head within the pressure cylinder. Alternatively, compression and extension of the spring may result in the gaseous valve 120 and the liquid valve 126 being opened and/or closed in response to the storage pressure indicated by the pressure cylinder. Accordingly, the gaseous line 120 and the gaseous valve 124 may permit the cryogenic fluid to be extracted in the gaseous phase from the storage tank while the storage pressure exceeds the pressure threshold. Similarly, the liquid line 122 and the liquid valve 126 may permit the cryogenic fluid to be extracted in the liquid phase from the storage tank 114 while the storage pressure is less than the pressure threshold.

In some examples, a boil-off valve 134 and a boil-off controller 136 may be utilized to maintain the cryogenic fluid within the storage tank. In particular, the storage tank 114 stores the cryogenic fluid as a mixed phase fluid, wherein the cryogenic fluid exists in a gaseous phase and a liquid phase that are in equilibrium. As the storage temperature of the cryogenic fluid increases, the equilibrium between the gaseous phase and the liquid phase will adjust, resulting in an amount of the cryogenic fluid evaporating into the gaseous phase and the storage pressure increasing as the amount of cryogenic fluid transitions to the gaseous phase. Additionally, the storage tank 114 can be monitored, via a pressure sensor, by the boil-off controller 136. The boil-off controller 136 can be configured to maintain the cryogenic fluid to mitigate over-pressurization of the storage tank 114 and waste of the cryogenic fluid due to venting. For example, the storage tank 114 may be associated with a maximum pressure threshold (e.g., 150 PSI, 250 PSI, 350 PSI, etc.) that indicates a maximum storage pressure that is associated with increased chances of storage tank failure and/or safety issues. The maximum pressure threshold may incorporate safety factors that reduce the maximum pressure threshold below the maximum storage pressure that the storage tank 114 is rated for. Accordingly, the boil-off controller 136 may be configured to determine, based at least on the storage pressure that is detected by the pressure sensor, that the storage pressure exceeds one or more pressure thresholds and/or the maximum pressure threshold. Further, the boil-off controller 136 may utilize the boil-off valve 134 to reduce the storage pressure of the cryogenic fluid.

In some examples, the boil-off controller 136 may utilize the boil-off valve 134 to extract the cryogenic fluid in the gaseous phase from the storage tank 114. Additionally, the cryogenic fluid in the liquid phase and the boil-off fluid may exist at a first equilibrium associated with a first storage temperature and a first storage pressure, the first storage pressure exceeding the one or more pressure thresholds. The boil-off controller 136 may determine, based at least on the first storage pressure of the storage tank 114, that boil-off fluid (e.g., cryogenic fluid in the gaseous phase) is to be extracted from the storage tank 114 to reduce the storage pressure and auto-refrigerate the cryogenic fluid. In particular, the boil-off valve 134 may be fluidly connected to an upper portion of the storage tank 114 such that the boil-off valve 134 extracts the boil-off fluid while the cryogenic fluid in the liquid phase remains in the storage tank 114. Due to the boil-off fluid (or an amount of the boil-off fluid) being extracted, the cryogenic fluid begins to evaporate and produce additional boil-off fluid. However, evaporation of the cryogenic fluid absorbs thermal energy within the storage tank 114 and reduces the storage temperature within the storage tank 114. Accordingly, the storage tank 114 may achieve a second equilibrium between a second storage temperature and a second storage pressure after the boil-off fluid is extracted, the second storage temperature less than the first storage temperature and the second storage pressure less than the first storage pressure.

In some examples, the boil-off valve 134 may be configured to extract the boil-off fluid from the storage tank 114 and provide the boil-off fluid to the backup power system 128. In particular, the boil-off valve 134 may be configured to permit the boil-off fluid to exit the storage tank 114 and be provided to the backup power system 128 via a boil-off line 138. Additionally, the boil-off controller 136 may cause the backup power system 128 to be activated to consume the boil-off fluid extracted via the boil-off valve 134 and provided via the boil-off line 138. The backup power system 128 may receive the boil-off fluid and consume the boil-off fluid to generate power to supplement the power and/or reduce the power generated by and/or received from the primary power system 132. Accordingly, the boil-off fluid may be utilized by the boil-off mitigation system 100 rather than being vented to atmosphere.

Figure 2A:
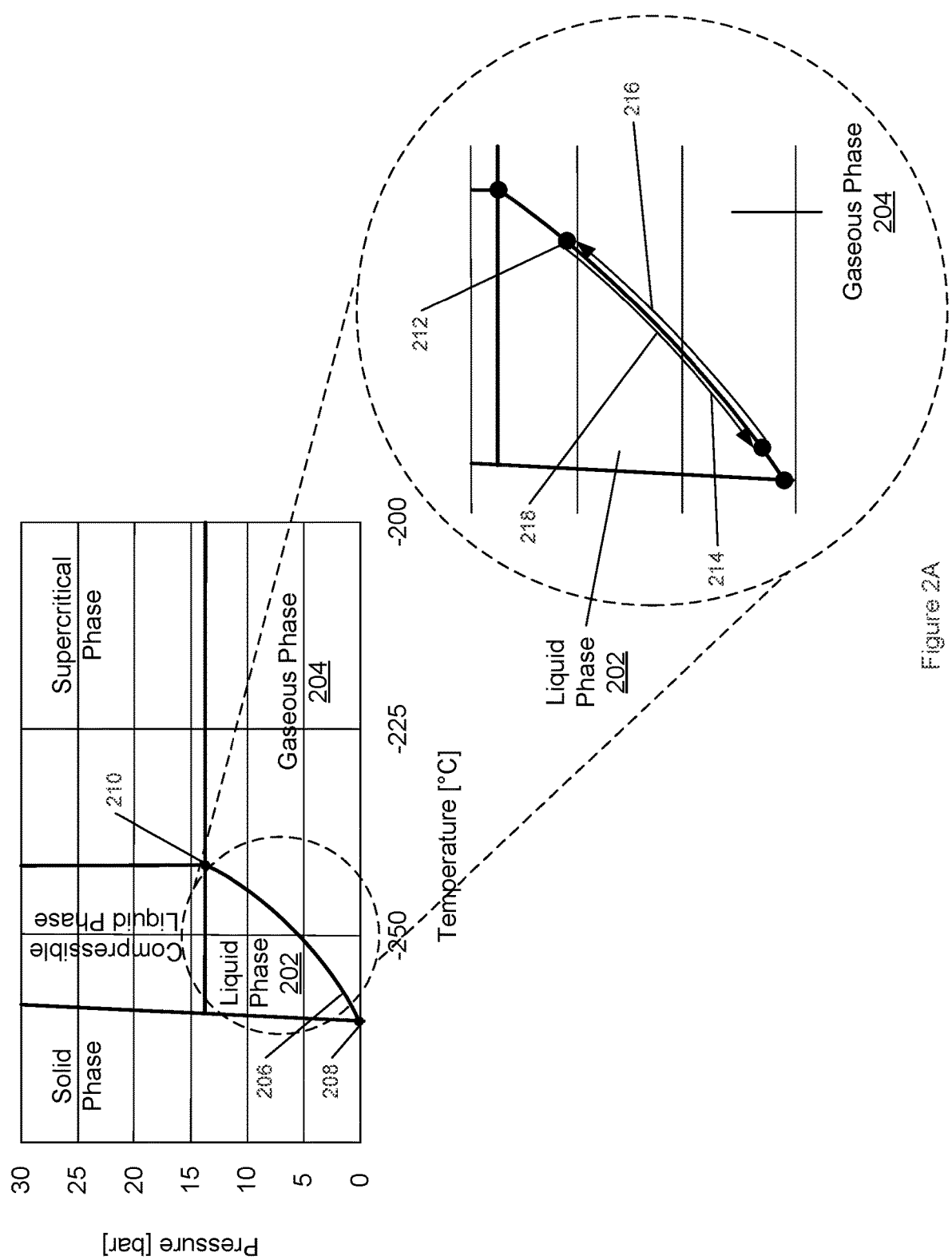
FIG. 2A is an illustration of a potential operating space for the cryogenic fluid management system and a boil-off management system, as illustrated by FIG. 1, according to examples of the present disclosure.

FIG. 2A is an illustration of a potential operating space for a boil-off mitigation system. In particular, FIG. 2A is an approximation of a phase diagram for diatomic hydrogen. However, it should be noted that FIG. 2A is an approximation and various values and bounding lines for individual phases may not exactly map to real world values. FIG. 2A includes an approximation of the temperatures and pressures where the liquid phase 202 can vaporize/evaporate into the gaseous phase 204 and the gaseous phase 204 can condense into the liquid phase 202. This curve can be referred to as the vaporization curve 206. Additionally, FIG. 2A includes an approximation of the triple point 208 and the critical point 210.

It should be noted that despite the representation of the triple point 208 and the critical point 210 within FIG. 2A, these phenomena have real world temperatures and pressures associated with them. In particular, the triple point of hydrogen, where the solid phase, liquid phase 202, and gaseous phase 204 exist in equilibrium, occurs at approximately 13.84 K/−259.31° C. and 7.04 kPa/0.0704 bar. Similarly, the critical point of hydrogen, where the liquid phase 202 and gaseous phase 204 cease to coexist and form a supercritical fluid, occurs at approximately 33.20 K/−239.95° C. and 1300 kPa/12.97 bar. Accordingly, the vaporization curve 206 represents the temperatures and pressures where hydrogen in the liquid phase 202 may vaporize into the gaseous phase 204 and hydrogen in the gaseous phase 204 may condense into the liquid phase 202.

In some examples, the boil-off mitigation system 100, described above by FIG. 1, can be configured to operate within the gaseous phase 204 and the liquid phase 202. In particular, the boil-off mitigation system 100 can be configured to reduce the storage temperature and the storage pressure when the boil-off controller determines that the storage pressure exceeds a pressure threshold. For example, the storage temperature and the storage pressure may fluctuate along the vaporization curve between a first equilibrium 212 and a second equilibrium 214. More specifically, the boil-off mitigation system 100 may be configured to reduce the cryogenic fluid within the storage tank 114 from the first equilibrium 212 to the second equilibrium 214 based at least on the first equilibrium being associated with a first pressure that exceeds one or more pressure thresholds. Over a period of time, the storage pressure and the storage temperature may increase from the second equilibrium 214 to the first equilibrium in a first direction 216 due to ambient thermal energy (e.g., an environment that the storage tank 114 is placed within may exist at an ambient temperature of 20° C. and an ambient pressure of 1 bar) heating the storage tank 114 and the cryogenic fluid within the storage tank 114. Similarly, the boil-off mitigation system 100 may reduce the storage temperature and the storage pressure from the first equilibrium 212 to the second equilibrium 214 in a second direction 218 by extracting the boil-off fluid.

In some examples, the storage pressure within the storage tank 114 may increase along the first direction 216 based at least on the storage temperature increasing and causing the cryogenic fluid to evaporate. The evaporation of the cryogenic fluid causes an increase in the storage pressure, moving the storage temperature and the storage pressure in the first direction 216. The storage temperature and the storage pressure may continue to climb in the first direction 216 and may be monitored by the boil-off controller 136. It should be noted that the cryogenic fluid in the liquid phase seeks equilibrium with the boil-off fluid in the gaseous phase as the storage temperature and the storage pressure increases in the first direction 216.

In some examples, the storage temperature and the storage pressure may reach the first equilibrium 212 that is associated with a pressure threshold. In particular, the boil-off controller 136 may determine that the storage pressure and exceeds the pressure threshold and cause the boil-off fluid to be extracted from the storage tank 114. It should be noted that the boil-off controller 136 may cause the boil-off valve 134 to open and permit the storage pressure to drive the boil-off fluid through the boil-off line 138, a boil-off pump to extract the boil-off fluid, and/or the boil-off fluid to otherwise be obtained from the storage tank and provided by the boil-off line 138. Additionally, the boil-off fluid leaving the storage tank 114 drops the storage pressure along the second direction 218. As the storage pressure drops, the storage pressure is reduced due to evaporation of the cryogenic fluid absorbing thermal energy. The thermal energy that is utilized for the phase transition from liquid to gas can be extracted via the boil-off fluid being extracted via the boil-off valve 134 and the boil-off line 138. Accordingly, as the storage pressure is reduced along the second direction 218, the storage tank 114 is cooled until the cryogenic fluid reaches the second equilibrium.

In some examples, the storage pressure and the storage temperature may reach the second equilibrium 214 that is associated with an additional pressure threshold. In particular, the boil-off controller 136 may determine that the storage pressure has been reduced below the additional pressure threshold, the additional pressure threshold associated with a minimum storage tank pressure that is to be maintained within the storage tank 114 (e.g., the minimum storage tank pressure may be slightly above atmospheric pressure and/or an internal pressure of the backup power system 128 to prevent backflow into the storage tank 114). Accordingly, the boil-off controller 136 may cause the boil-off valve 134 to prevent the boil-off fluid from exiting the storage tank 114.

Figure 2B:
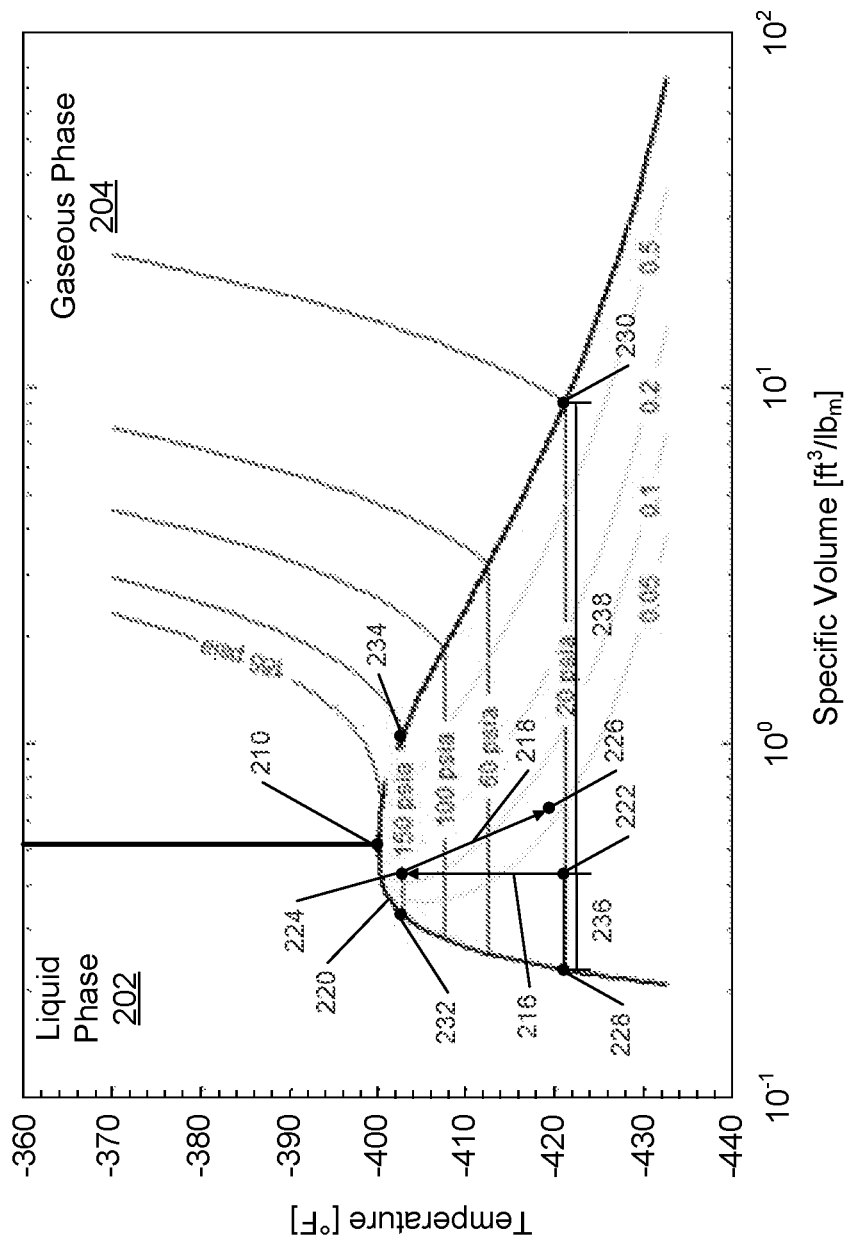
FIG. 2B is an illustration of a potential operating space for the cryogenic fluid management system and a boil-off management system, as illustrated by FIG. 1, according to examples of the present disclosure.

FIG. 2B is an illustration of a potential operating space for a boil-off mitigation system. However, it should be noted that FIG. 2B is an approximation and various values and bounding lines may not exactly map to real world values. FIG. 2B includes an approximation of a vapor dome 220 where the hydrogen within the storage tank 114 may exist in the liquid phase 202 and the gaseous phase 204. In response to changes in the storage temperature and the storage pressure, the hydrogen within the storage tank can transition between the liquid phase 202 and the gaseous phase 204 via evaporation and condensation.

In some examples, the hydrogen in the storage tank 114 may exist at a first equilibrium 222 that is associated with a first storage temperature and a first storage pressure. Additionally, due to the storage tank 114 being a substantially sealed environment, the hydrogen within the storage tank 114 may substantially retain a first specific volume as an internal volume of the storage tank 114 remains constant and the amount of hydrogen within the storage tank 114 remains constant. Further, transfer of thermal energy over time from the ambient environment to the hydrogen within the storage tank causes the storage temperature and the storage pressure to increase. More specifically, as the specific volume of the hydrogen is constant, increased storage temperature results in an increase storage pressure. Accordingly, the storage pressure and the storage temperature increase from the first storage temperature and the first storage pressure to a second storage temperature and a second storage pressure in the first direction 216.

In some examples, the hydrogen in the storage tank 114 may reach a second equilibrium 224 that is associated with the second storage temperature and the second storage pressure. Additionally, the second storage pressure of the second equilibrium 224 may be determined to exceed one or more pressure thresholds that cause the boil-off fluid to be removed from the storage tank 114 to ensure that the boil-off fluid does not excessively build up within the storage tank 114. Accordingly, the boil-off fluid (e.g., the hydrogen that exists in the gaseous phase 204) can be extracted from the storage tank 114 to reduce the storage temperature and the storage pressure to a third storage temperature and a third storage pressure in the second direction 218. Further, the third storage temperature and the third storage pressure may be associated with a third equilibrium 226. It should be noted that removal of the boil-off fluid reduces the amount of hydrogen (e.g., the mass of the hydrogen within the storage tank 114) while the volume within the storage tank 114 remains constant. The reduction in the amount of hydrogen increases the specific volume of the two-phase mixture of hydrogen and results in the third equilibrium 226 being achieved at a specific volume greater than the specific volume of the first equilibrium 222 and the second equilibrium 224.

In some examples, the first equilibrium 222 is associated with a first liquid fraction 228 and a first gas fraction 230. Similarly, the second equilibrium is associated with a second liquid fraction 232 and a second gas fraction 234. The first liquid fraction 228 and the first gas fraction 230 indicate a mass fraction of the amount of hydrogen that exists in the liquid phase 202 and the gaseous phase 204, respectively. Additionally, the first liquid fraction 228 can be determined based at least in part on a first distance 236 between the specific volume of the first equilibrium 222 and the specific volume of the first liquid fraction 228. Further, the first gas fraction 230 can be determine based at least in part on a second distance 238 between the specific volume of the first equilibrium 222 and the specific volume of the first gas fraction 230. As the storage temperature increases from the first storage temperature to the second storage temperature, a portion of the first liquid fraction 228 evaporates into the first gas fraction 230 until the second liquid fraction 232 and the second gas fraction 234 is achieved at the second equilibrium 224. Removal of the second gas fraction 234 (or at least a portion of the second gas fraction 234) decreases the storage pressure and the storage temperature in the second direction as the second liquid fraction 232 begins to evaporate to achieve the third equilibrium 226. The evaporation of the second liquid fraction 232 absorbs thermal energy within the storage tank 114 and refrigerates the hydrogen within the storage tank 114.

Accordingly, and over cyclical operation of the boil-off mitigation system illustrated by FIG. 1, the amount of hydrogen within the storage tank 114 will gradually be consumed by the backup power system 128 while maintaining the hydrogen within the storage tank at safe storage temperature and storage pressure. It should be noted that the various equilibrium points, gas fractions, liquid fractions, and changes in process variables (e.g., storage temperature, storage pressure, specific volume, etc.) are illustrative and not indicative of real-world values for implementations of the described boil-off mitigation system.

Figure 3:
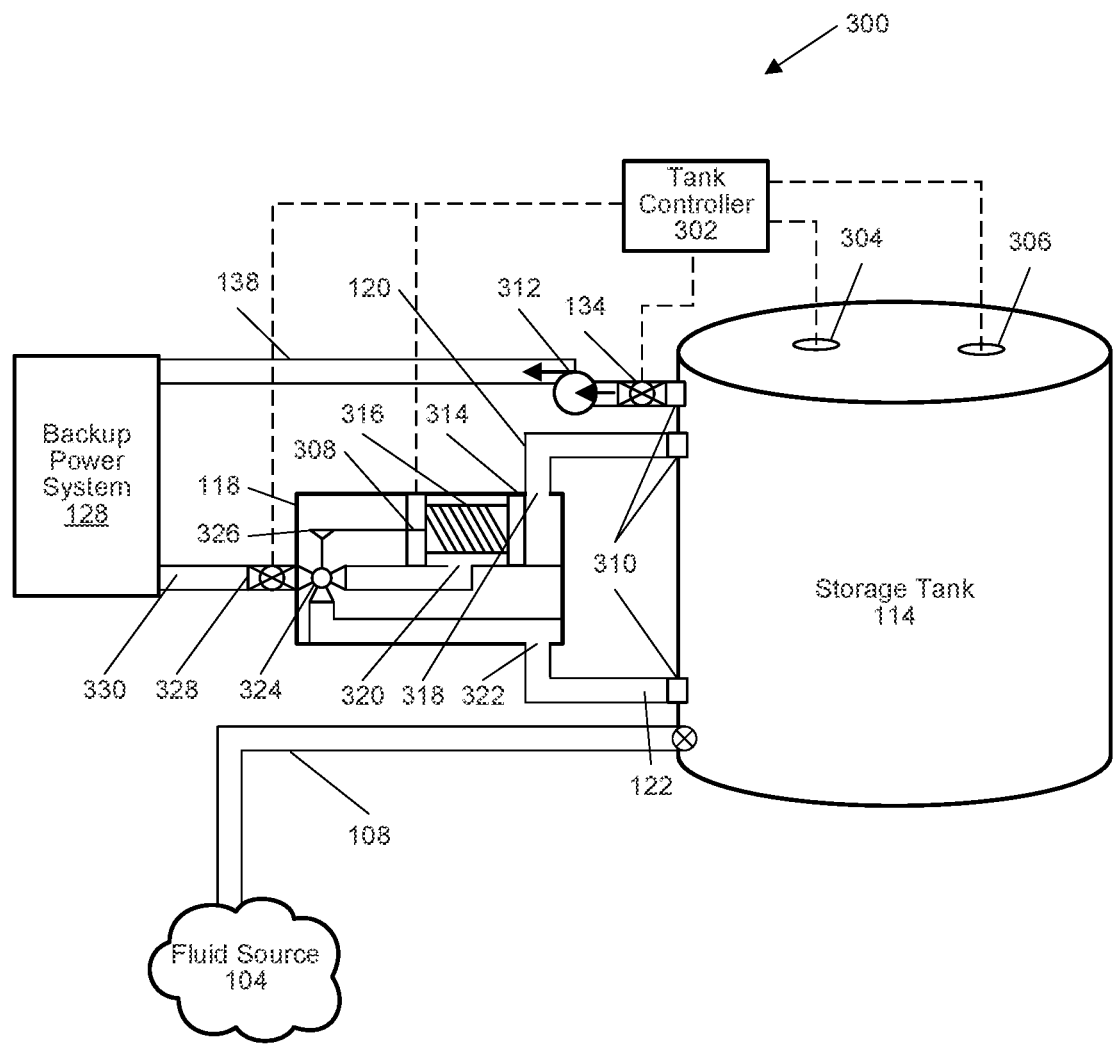
FIG. 3 is a schematic illustration of the cryogenic fluid management system and a boil-off management system that utilizes a boil-off fluid pathway and a backup power system fuel pathway according to further examples of the present disclosure.

FIG. 3 is a schematic illustration of a boil-off mitigation system 300 according to further examples of the present disclosure. The boil-off mitigation system 300 can include many features discussed above with reference to FIGS. 1 and 2. In particular, the boil-off mitigation system 300 can include a tank controller 302 configured to maintain the cryogenic fluid within the storage tank 114 and cause the cryogenic fluid to be provided to the backup power system 128. The tank controller 302 may receive indications of temperature and pressure from sensors including a tank pressure sensor 304, a tank temperature sensor 306, an economizer state sensor 308, and one or more additional sensors associated with the boil-off mitigation system 300. Additionally, the boil-off mitigation system 300 may direct the cryogenic fluid via fluid handling components including one or more storage tank ports 310, a boil-off pump 312, the gaseous line 120, the liquid line 122, and other fluid lines that direct the cryogenic fluid from the storage tank 114 to the backup power system 128. Accordingly, the tank controller 302 can be configured to monitor the cryogenic fluid within the storage tank 114 and manage the boil-off fluid generated by the cryogenic fluid.

The boil-off mitigation system 300 can receive the cryogenic fluid from the fluid source (e.g., hydrogen source) 104 vias the first line 108 (or the second line 110) and store the cryogenic fluid in the storage tank 114. In particular, the fluid source 104 and the first line 108 can include connector valves for pipes, hoses, and/or other fluid connections that are controlled by an intake controller or by an operator associated with the boil-off mitigation system 300. The connector valves can include permanent connections with the fluid source 104 (e.g., for internal hydrogen source such as hydrolysis or electrolysis system and for external vendors that provide a pipeline to the facility) and/or temporary connections with the fluid source 104 (e.g., hydrogen source is a tank brought to the facility by truck and/or rail that connects to the intake mechanism and injects an amount of hydrogen). Independent of the nature of the fluid source 104, the intake mechanism can regulate input pressure (e.g., via throttling valves), regulate cryogenic fluid flowrate, monitor input pressure (e.g., via pressure sensors), and monitor input temperature (e.g. via temperature sensors) through communications with various sensors associated the fluid source 104 and signals transmitted to various components of the fluid source 104 (e.g., signals can control the amount of pressure reduction caused by throttling valves and/or the amount of pressurization caused by pumps).

In some examples, the tank controller 302 can be configured to monitor at least the storage temperature and the storage pressure associated with the storage tank 114. In particular, the storage tank 114 can be a cryogenic storage tank that is configured to contain cryogenic fluids within a cryogenic environment (e.g., temperatures below $-50°$ C.) and, optionally within a pressurized environment (although it should be noted that storage of hydrogen and other combustible cryogenic fluids is commonly under pressure to avoid leaks drawing oxidizing agents into the storage tank/the boil-off mitigation system 300). Accordingly, the storage tank 114 can be an insulated storage tank (such as Dewar flasks which are double walled containers that include high vacuum between the walls) that may include internal cooling systems (although these are commonly disincentivized by the additional thermal energy transfer enabled by internal cooling systems), one or more sensors for monitoring the cryogenic fluid (e.g., the tank pressure sensor 304 and the tank temperature sensor 306), and one or more connectors that enable the cryogenic fluid to be extracted from and input into the storage tank 114 (e.g., the one or more storage tank ports 310). In some additional examples, the storage tank 114 can include fluid control devices (e.g., valves, openings, etc.) that are operatively controlled by the tank controller 302. The fluid control devices can be configured to direct the boil-off fluid and the cryogenic fluid from the storage tank 114 to the backup power system 128. For example, the fluid control devices can include the economizer valve 118, the gaseous line 120, the liquid line 122, the boil-off valve 134, the boil-off line 138, and internal components of the economizer valve 118. Additionally, the fluid control devices can include the one or more storage tank ports, the boil-off pump 312, and/or other components that are configured to extract and/or provide the cryogenic fluid and/or the boil-off fluid from the storage tank 114 to the backup power system. It should be noted that the fluid control devices may cause the boil-off fluid and/or the cryogenic fluid to be extracted and/or provided from the storage tank 114 to the backup power system 128. Alternatively, the storage pressure of the storage tank 114 may be sufficient to cause the boil-off fluid and/or the cryogenic fluid to flow from the storage tank 114 to the backup power system 128. It is to be appreciated that for each of the labeled components there may be any number of valves, connectors, and/or pumps involved to fully regulate the flow of the cryogenic fluid and/or the boil-off fluid, and that the location of the components may vary.

The cryogenic fluid within the storage tank 114 can be a mixed phase solution comprised of a liquid phase (e.g., a majority of the hydrogen stored by the storage tank 114) and a gas phase. As the cryogenic fluid warms, the liquid phase evaporates and enters the gaseous phase as the boil-off fluid. The tank controller 302 can be configured to detect when the storage temperature and/or the storage pressure of the cryogenic fluid within the storage tank 114 satisfy (e.g., exceed) a pressure threshold (or a temperature threshold) that indicates the boil-off fluid is to be reduced (e.g., an amount of the gaseous phase is to be removed from the storage tank 114). Accordingly, the tank controller 302 can be configured to cause the boil-off fluid (e.g., hydrogen in the gaseous phase) to be extracted from the storage tank 114 and directed to the backup power system 128. As noted above, removal of the boil-off fluid results in the storage temperature and the storage pressure within the storage tank 114 being reduced as the cryogenic fluid absorbs thermal energy to evaporate, replaces the boil-off fluid, and self-refrigerates to maintain equilibrium.

In some example, and as noted above, the tank controller 302 can be configured to monitor the storage temperature and the storage pressure of the hydrogen within the storage tank 114. In particular, the tank controller 302 can monitor the storage pressure via the tank pressure sensor 304 and the storage temperature via the tank temperature sensor 306. The tank controller 302 can be configured to monitor the storage temperature and the storage pressure relative to one or more pressure thresholds. These thresholds can be safety thresholds (e.g., internal pressure and/or temperature of the storage tank 114 is to remain below the one or more thresholds to prevent failure of the storage tank), efficiency thresholds (e.g., minimizing energy requirements to maintain hydrogen levels within the storage tank 114), and/or other thresholds determined on operational and/or business parameters. For example, a pressure threshold can be associated with a storage pressure that indicates an amount of boil-off fluid within the storage tank 114 and that the storage pressure is approaching a pressure limit of the storage tank 114 (this may include safety factors). Accordingly, the tank controller 302 can detect that the pressure threshold has been exceeded by the storage pressure and cause the boil-off fluid to be extracted via the boil-off pump 312. Additionally, and in response to the storage pressure exceeding the pressure threshold, the tank controller 302 can cause the boil-off valve 134 to open and fluidly connect the storage tank 114 with the backup power system 128 via the boil-off line 138. It should be noted that the tank controller 302 can be configured to operate the boil-off valve 134 and the boil-off pump 312 to manage the flow of the boil-off fluid via electronic lines and/or via wireless control. Further, the tank controller 302 can communicate with the tank pressure sensor(s) 304 and the tank temperature sensor(s) 306 to request and receive indicates of the storage pressure and the storage temperature via electronic lines and/or via wireless control.

In some examples, the tank controller 302 may be configured to monitor the economizer valve 118 to determine whether the boil-off fluid is to be extracted from the storage tank 114. In particular, the tank controller 302 may receive an indication of an economizer state from the economizer state sensor 308. The economizer state sensor 308 may be configured to transmit, to the tank controller 302, an indication of whether the economizer valve 118 fluidly connects the gaseous line 120 or the liquid line 122 with the backup power system 128 via an economizer output line 330. Additionally, the economizer state sensor 308 can be connected to a sealing plate 314 and/or a compressible component 316 (e.g., a spring) that substantially prevent the boil-off fluid (e.g., the cryogenic fluid in the gaseous phase) from being provided to the backup power system 128 while the storage pressure is less than a pressure threshold. For example, the economizer valve 118 may be configured such that the boil-off fluid enters the economizer valve 118 via a pressure chamber opening 318. The boil-off fluid may apply, based at least on the storage pressure with the storage tank 114, a first amount of force to the sealing plate 314 that at least partially compresses the compressible component 316. Further, the sealing plate 314 may be configured to substantially prevent the boil-off fluid from passing from the pressure chamber opening 318 to a pressure chamber exit 320 while the compressible component 316 is not fully compressed.

In some examples, the economizer valve 118 may be switch between a first state and a second state based on whether the storage pressure within the storage tank 114 exceeds the pressure threshold. In particular, the first state may configure the economizer valve 118 to permit the boil-off fluid to be obtained from the storage tank 114 and provided to the backup power system 128. Additionally, the second state may configure the economizer valve 118 to permit the cryogenic fluid in the liquid phase to be obtained from the storage tank 114 and provided to the backup power system 128. It should be noted that the first state substantially prevents the liquid phase from being provided to the backup power system 128 and the second state substantially prevents the gaseous phase from being provided to the backup power system 128. The first state may be associated with the compressible component 316 being fully compressed and/or being sufficiently compressed (e.g., compressed a distance that exceeds a compression distance threshold) to permit the boil-off fluid to pass from the pressure chamber opening 318 to the pressure chamber exit 320. The second state may be associated with the compressible component 316 being partially compressed and/or being insufficiently compressed (e.g., compressed a distance that is less than a compression distance threshold) such that the boil-off fluid cannot pass through the pressure chamber exit 320. Accordingly, the economizer valve 118 can be configured to regulate the phase of the cryogenic fluid that is provided to the backup power system. It should be noted that the economizer valve 118 can be a mechanical system (e.g. the economizer valve 118 internally switches between the first state and the second state based on the amount of force applied to the sealing plate 314 and the compressible component 316) and/or a signal controlled system (e.g., the tank controller 302 may transmit a signal that causes the economizer valve 118 to switch between the first state and the second state based at least on the economizer state sensor 308 transmitting an indication of the compression of the compressible component 316).

In some examples, the economizer valve 118 may be configured to regulate the cryogenic fluid that is provided to the backup power system 128 when the primary power system 132 fails to meet the power demand of the facility systems 130. In particular, the economizer valve 118 may be configured to regulate whether the boil-off fluid is provided based at least on the storage pressure within the storage tank 114. For example, the backup power system 128 can be activated when the primary power system 132 fails to meet the power demand of the facility systems and the tank controller 302 can cause the cryogenic fluid to be obtained from the storage tank 114 by operating the gaseous valve 124, the liquid valve 126, an economizer flow valve 328, and/or other flow valves to fluidly connect the backup power system 128 and the storage tank 114. Additionally, the economizer valve 118 may include a gaseous flow path where the gaseous line 120 passes the boil-off fluid from the storage tank 114, through the pressure chamber opening 318 and the pressure chamber exit 320 (where the storage pressure exceeds the pressure threshold associated with the compressible component 316), and out a state switched valve 324. Further, the economizer valve 118 may include a liquid flow path where the liquid line 122 passes the cryogenic fluid from the storage tank 114, through a fluid opening 322, and out the state switched valve 324. Accordingly, the state switched valve 324 may be operated via a state switch 326 to fluidly connect the gas flow path or the liquid flow path with the economizer output line 330 based on the economizer valve state. It should be noted that the economizer valve 118 illustrated by FIG. 3 is only an example implementation of the economizer valve 118. In general the economizer valve 118 can be configured such that, in the first state, boil-off fluid may pass through the economizer valve 118 and, in the second state, liquid cryogenic fluid may pass through the economizer valve 118 from the storage tank 114 to the backup power system 128. Additionally, the economizer valve 118 may switch between the first state and the second state based on at least one pressure threshold to maintain the storage pressure below the pressure threshold. Further, the economizer state sensor 308 may be associated with the economizer valve 118 to detect whether the economizer valve 118 is in the first state or the second state and transmit an indication of the economizer valve state to the tank controller 302.

In some examples, the economizer valve 118 may remain in fluid communication with the cryogenic fluid and the storage tank 114 while the primary power system 132 is satisfying the power demands of the facility systems 130. In particular, the gaseous line 120 may fluidly connect the storage tank 114 with the pressure chamber opening 318 such that the boil-off fluid may switch the economizer valve between the first state and the second state without passing through the pressure chamber exit 320. More specifically, the economizer flow valve 328 may prevent the cryogenic fluid and/or the boil-off fluid from being provided to the backup power system 128 as the primary power system 132 is providing sufficient power and the storage pressure may be monitored via the economizer state sensor. The economizer state sensor 308 can be configured to transmit an indication of the economizer valve state when the storage pressure causes the economizer valve to switch between the first state and the second state. Accordingly, the tank controller can receive the indication of the economizer valve state and determine that the storage pressure exceeds the pressure threshold of the storage tank 114 based on the indication. Additionally, and based at least on determining that the economizer valve state indicates that the storage pressure exceeds the storage threshold, the tank controller 302 can cause the boil-off fluid to be obtained from the storage tank 114 and provided to the backup power system 128 via the boil-off valve 134 and the boil-off pump 312.

In some examples, the tank controller 302 may manage the boil-off fluid within the storage tank 114 based at least on the economizer valve state. In particular, the economizer valve 118 may be in the first state when the storage pressure exceeds the pressure threshold associated with the maximum pressure of the storage tank (e.g., storage pressure is to be reduced below the pressure threshold to prevent the maximum pressure of the storage tank from being reached). The tank controller 302 may be configured to continuously, periodically, aperiodically, and/or otherwise receive an indication of the economizer valve state from the economizer state sensor 308. Additionally, the tank controller 302 may determine that the economizer valve 118 has switched to the first state and determine that the storage pressure exceeds the pressure threshold based at least on the economizer valve switching to the first state. Further, the tank controller 302 may transmit a signal to the boil-off valve 134 and/or the boil-off pump 312 that cause the boil-off fluid to be obtained from the storage tank and consumed by the backup power system 128 to generate power that reduces the power demand on the primary power system 132. Accordingly, the tank controller 302 may monitor the economizer valve state via the economizer state sensor 308 to determine whether the boil-off fluid within the storage tank 114 is to be reduced.

In some examples, the tank controller 302 may manage the cryogenic fluid within the storage tank 114 based at least on the economizer valve state. In particular, and after the tank controller 302 has caused the boil-off fluid to be removed from the storage tank 114, the tank controller can determine that the storage pressure has been reduced below the pressure threshold and, optionally, an additional pressure threshold. While the boil-off fluid is being removed from the storage tank 114, the tank controller 302 can receive an additional indication from the economizer state sensor 308 that indicates the economizer valve 118 has switched from the first state to the second state. More specifically, the economizer valve 118 may switch from the first state to the second state when the storage pressure of the boil-off fluid is reduced below the pressure threshold and/or the additional pressure threshold. The additional pressure threshold may be associated with a minimum pressure of the storage tank (e.g., storage pressure is to remain above the additional pressure threshold to prevent backflow into the storage tank that may include oxidizing agents and/or other contaminants). Accordingly, the tank controller may receive the additional indication and transmit an additional signal that causes the boil-off valve 134 and/or the boil-off pump 312 to substantially prevent the boil-off fluid from being provided to the backup power system.

In some examples, the economizer state sensor 308 is configured to transmit one or more indications (e.g., the indication, the additional indication, etc.) to the tank controller 302 based at least on the compression component 316 causing the state switch 326 to fluidly connect the gas flow path or the liquid flow path with the economizer output line 330. In particular, the gas flow path and the liquid flow path are fluidly connected to the economizer output line 330 via the state switched valve 324. The state switched valve 324 can be configured to provide the boil-off fluid or the cryogenic fluid to the economizer output line 330. Additionally, the state switched valve 324 can be configured to provide the boil-off fluid to the economizer output line 330 when the economizer valve 118 is in the first state and the cryogenic fluid to the economizer output line when the economizer valve 118 is in the second state. More specifically, the state switched valve 324 can be operable to fluidly connect the gas flow path or the liquid flow path to the economizer output line 330 depending on whether the state switch 326 has changed the state switched valve to the first state (gas flow path connected to economizer output line 330) or the second state (liquid flow path connected to the economizer output line 330). Further, the state switch 326 can switch the state switched valve 324 to the first state when the compressible component 316 is fully compressed (e.g., the compressible component 316 cannot be further compressed and the sealing plate 314 is retracted to fluidly connect the pressure chamber opening 318 and the pressure chamber exit 320, the compressible component 316 is compressed a distance that is greater than a distance threshold, etc.). Similarly, the state switch 326 can switch the economizer state valve to the second state when the compressible component 316 is not fully compressed and/or is compressed a distance that is less than a distance threshold. Accordingly, the state switched valve 324 can be toggled between the first state and the second state by the state switch 326 and the economizer state sensor 308 can transmit one or more indications of the economizer state to the tank controller 302. Alternatively, or in addition, the state switch 326 is operable by the tank controller 302 to toggle the state switched valve 324 between the first state and the second state based at least on the economizer state sensor 308 transmitting the one or more indications associated with the storage pressure and the compressible component 316.

Figure 4:
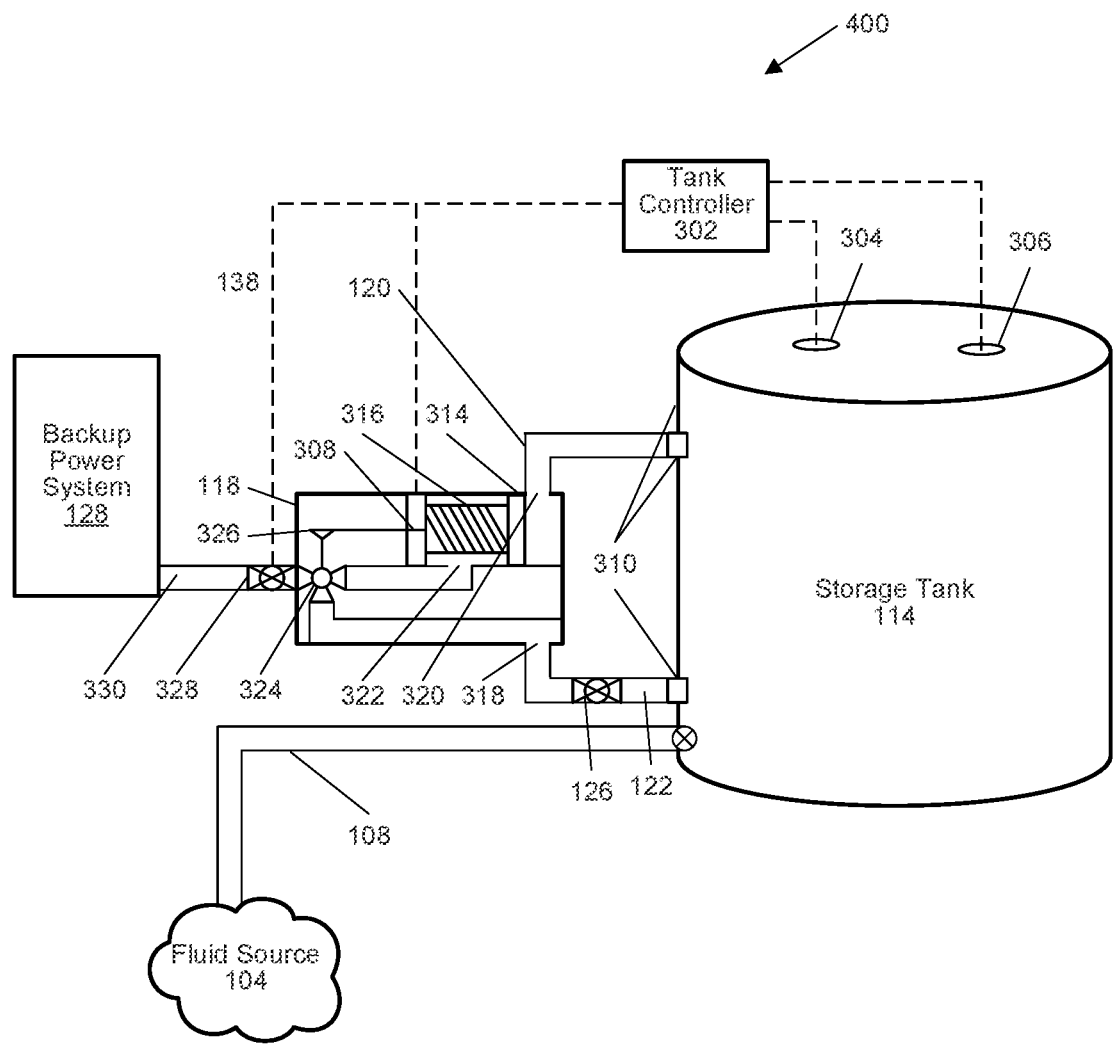
FIG. 4 is a schematic illustration of the cryogenic fluid management system and a boil-off management system that utilizes a unified fluid pathway for the boil-off fluid and the backup power system fuel according to further examples of the present disclosure.

FIG. 4 is a schematic illustration of a boil-off mitigation system 400 according to further examples of the present disclosure. The boil-off mitigation system 400 can include many features discussed above with reference to FIGS. 1, 2, and 3. In particular, the boil-off mitigation system 400 can include the tank controller 302 configured to maintain the cryogenic fluid within the storage tank 114 via operation of the economizer valve 118. More specifically, the tank controller 302 may cause the boil-off fluid to be provided to the backup power system 128 via the economizer valve 118 in response to a determination that the storage pressure exceeds a pressure threshold. The tank controller 302 may receive indications of storage temperature and storage pressure from sensors including the tank pressure sensor 304, the tank temperature sensor 306, the economizer state sensor 308, and one or more additional sensors associated with the boil-off mitigation system 400. Additionally, the boil-off mitigation system 400 may direct the boil-off fluid via fluid handling components including gaseous line 120, the liquid line 122, the pressure chamber opening 318, the pressure chamber exit 320, the economizer output line 330 and other fluid lines that direct the cryogenic fluid from the storage tank 114 to the backup power system 128. Accordingly, the tank controller 302 can be configured to monitor the cryogenic fluid within the storage tank 114 and manage the boil-off fluid generated by the cryogenic fluid.

In some examples, the tank controller 302 can be configured to monitor the storage pressure via the tank pressure sensor 304. In particular, the tank controller 302 can be configured to request and/or receive an indication of the storage pressure within the storage tank 114 from the tank pressure sensor 304. As discussed above, the tank controller 302 can be configured to determine, based at least on the indication received from the tank pressure sensor 304, that the storage pressure exceeds a pressure threshold. Accordingly, the tank controller 302 can transmit, to the state switch 326, a first signal that causes the economizer circuit 118 to switch to and/or remain in the first state. Alternatively, or in addition, the tank controller 302 can transmit a second signal that causes the boil-off fluid to be obtained from the storage tank 114 and provided to the backup power system 128. For example, the second signal can be transmitted such that the gaseous valve 124 is opened to fluidly connect the storage tank with the economizer valve 118 via the gaseous line 120. Additionally, the boil-off fluid can be directed through the pressure chamber opening 318 and apply an amount of force to the sealing plate 314, compress the compressible component 316, and cause the state switch 326 to fluidly connect the pressure chamber exit 320 with the economizer output line 330. Accordingly, the boil-off fluid can be directed to and consumed by the backup power system 128.

In some examples, the tank controller 302 can be configured to monitor the storage pressure via the economizer state sensor 308. In particular, the tank controller 302 can be configured to request and/or receive an indication of the economizer valve state, wherein a first state is associated with the storage pressure exceeding the pressure threshold and a second state is associated with the storage pressure being less than the pressure threshold. Additionally, the tank controller 302 can monitor the economizer valve state, via the indication, and cause the boil-off fluid to be provided to the backup power system 128 while the economizer valve 118 is in the first state. More specifically, the economizer valve state can be correlated with the pressure threshold such that switching the economizer valve to the first state indicates that the boil-off fluid is to be extracted from the storage tank 114 and provided to the backup power system 128. Accordingly, the tank controller 302 can determine, based on the indication, that the economizer valve 118 is in the first state and cause the gaseous line 120 and the state switched valve 324 to direct the boil-off fluid through the economizer valve 118 to the backup power system.

Figure 5:
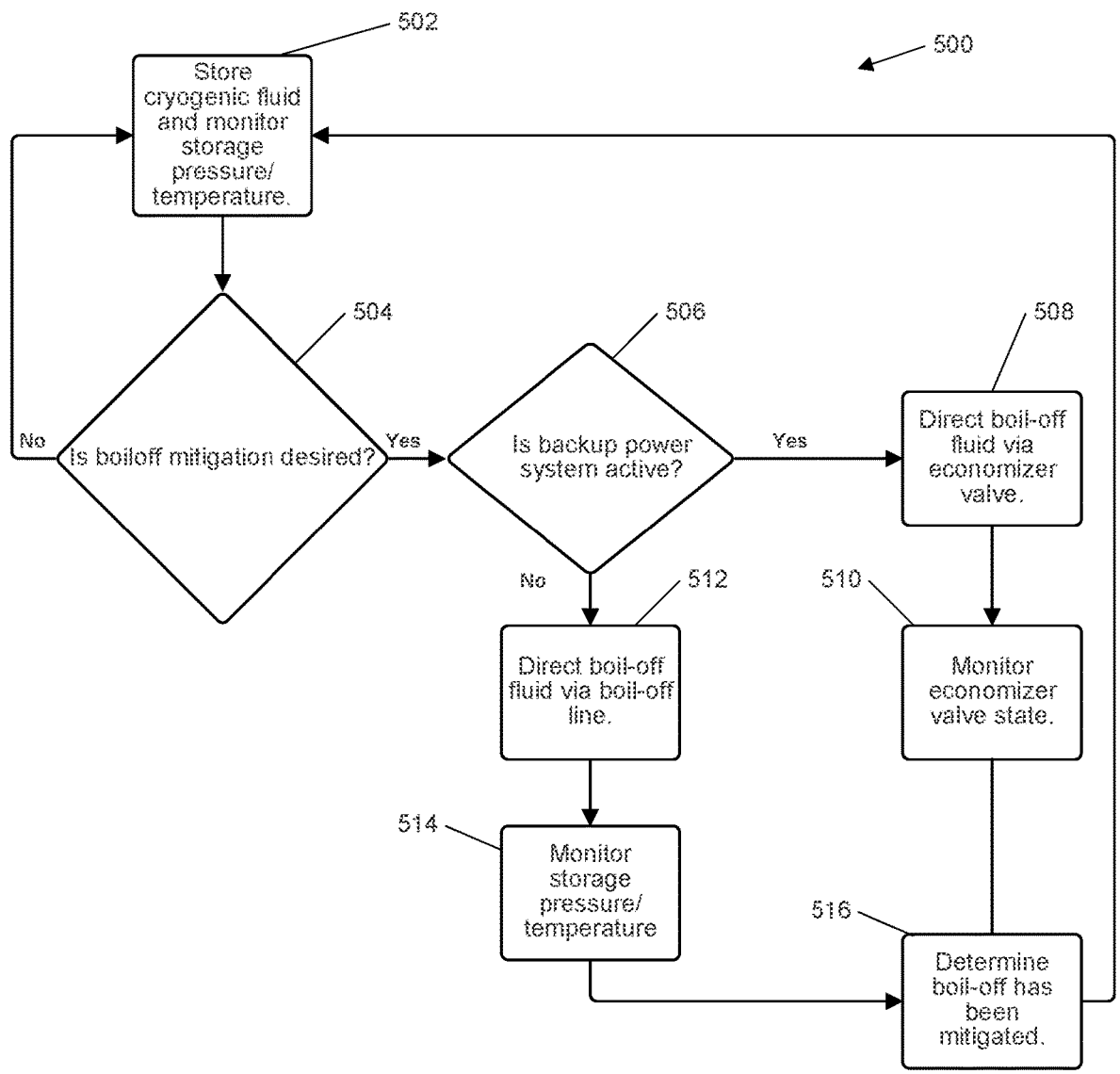
FIG. 5 is a block diagram illustrating a method according to examples of the present disclosure.

FIG. 5 is a block diagram of a method 500 according to examples of the present disclosure. The method 500 can be executed by a boil-off mitigation system as shown and described above with respect to FIGS. 1-4. At 502 the boil-off mitigation system can store and maintain a cryogenic fluid in a desirably cold and stable environment such as the storage tank 114. The storage temperature, the storage pressure, and any other desirable parameter can be monitored via the tank pressure sensor 304, the tank temperature sensor 306, and/or the economizer state sensor 308. At 504 the system checks whether the boil-off fluid within the storage tank 114 satisfies one or more pressure thresholds and/or one or more temperature thresholds. Additionally, the boil-off mitigation system can determine whether the boil-off fluid is to be extracted from the storage tank 114 and consumed by the backup power system 128. It should be noted that determination to extract the boil-off fluid can be based upon the one or more pressure thresholds, the one or more temperature thresholds, a schedule, and/or in response to direct intervention by an operator. If no such operation is desired, the system can return to monitoring at 502. The check at 504 can be performed as often as practically desired or on a set schedule. For example, the check at 504 can be performed substantially continuously, periodically, and/or aperiodically. Alternatively, or in addition, the system can determine that the boil-off fluid and the storage pressure have switched an economizer valve into a first state. The first state can be associated with the storage temperature and/or the storage pressure exceeding the one or more pressure thresholds and/or the one or more temperature thresholds.

At 506, and in response to the determination that the boil-off fluid is to be reduced and/or mitigated, the boil-off mitigation system can perform a second check to determine whether the facility systems are receiving power from the backup power system 128 or the primary power system. In particular, the boil-off mitigation system can be configured to determine whether the boil-off fluid is to be reduced for continued storage of the cryogenic fluid or mitigated during consumption of the cryogenic fluid via the backup power system. More specifically, the boil-off mitigation system may utilize a boil-off loop to reduce the boil-off fluid within the storage tank 114 that has accumulated due to warming of the cryogenic fluid over time and an economizer valve 118 to control a phase of the cryogenic fluid as the cryogenic fluid is provided to the backup power system 128. Alternatively, or in addition, the economizer valve 118 may be utilized to reduce the boil-off fluid accumulated during storage of the cryogenic fluid, wherein the one or more pressure thresholds and/or the one or more temperature thresholds utilized by the boil-off mitigation system may be associated with a first set of values when the primary power system 132 is provided power and a second set of valves when the primary power system 132 is not providing power.

At 508, the boil-off mitigation system can determine that the primary power system 132 is not providing power to the facility systems 130 and that the backup power system 128 is the primary power source for the facility systems 130. Additionally, the boil-off mitigation system can determine that the storage temperature and/or storage pressure exceeds the one or more temperature thresholds and/or the one or more pressure thresholds. Accordingly, the boil-off mitigation system can cause the economizer valve to be configured in a first state that directs boil-off fluid to be provided to the backup power system 128 and consumed to generate power for the facility systems 130. At 510, the boil-off mitigation system can monitor the economizer valve state to identify when the economizer valve 118 switches to a second state that provides the cryogenic fluid in a liquid phase via the liquid line 122. The economizer valve 118 can be configured to switch to the second state when the storage temperature and/or the storage pressure drops below an additional temperature threshold and/or an additional pressure threshold.

At 512, the boil-off mitigation system can determine that the primary power system is providing power to the facility systems 130 and that the backup power system is inactive. Additionally, the boil-off mitigation system can determine that the storage temperature and/or storage pressure exceeds the one or more temperature thresholds and/or the one or more pressure thresholds. Accordingly, the boil-off mitigation system can cause the boil-off loop to direct the boil-off fluid from the storage tank 114 to the backup power system 128. Alternatively, the boil-off mitigation system can cause the economizer valve to receive the boil-off fluid and to switch to the first state such that the boil-off fluid is provided to the backup power system. Independent of whether the economizer valve or the boil-off loop is utilized, the backup power system 128 can be activated to consume the boil-off fluid and reduce the storage temperature and the storage pressure of the storage tank. Further, the backup power system 128 can reduce the power received from the primary power system 132 through the consumption of the boil-off fluid. It should be noted that reducing the boil-off fluid in the storage tank 114 causes the cryogenic fluid to self-refrigerate through the cryogenic fluid evaporating within the storage tank 114 and absorbing thermal energy within the storage tank 114. At 514, the boil-off mitigation system can monitor the storage pressure, the storage temperature, and/or the economizer valve state to identify when the boil-off fluid has been sufficiently reduced within the storage tank 114. More specifically, the boil-off mitigation system can determine that the storage temperature has been reduced below an additional temperature threshold, that the storage pressure has been reduced below an additional pressure threshold, and/or that the economizer valve has switched to the second state. Accordingly, the boil-off loop and/or the economizer valve can be configured to prevent the boil-off fluid from being provided to the backup power system 128 and the backup power system to be deactivated based at least on the storage temperature being reduced below the additional temperature threshold and/or that the storage pressure being reduced below the additional pressure threshold.

At block 516, the boil-off mitigation system can be configured to determine that the boil-off fluid has been sufficiently reduced and/or mitigated and return to monitoring the storage tank 114 and the cryogenic fluid at block 502.

INDUSTRIAL APPLICABILITY

In a large-scale facility such as a data center, backup power can be provided by hydrogen-driven engines (or fuel cells) that consume hydrogen as fuel to provide power to the facility. The hydrogen-driven engines (or fuel cells) can provide lower carbon emissions, cleaner emergency power, and alternative fuel sources when compared to diesel gensets commonly utilized as backup power. Storing hydrogen can involve precise control schemes and maintenance of the storage tank (e.g., storage temperature and storage pressure) because liquid hydrogen must be stored at very low temperatures. The systems and methods of the present disclosure provide an economizer valve and a boil-off loop that can enable boil-off hydrogen that would otherwise be vented to atmosphere to be consumed by the backup power system to generate power. For example, the systems described herein may determine that the boil-Off hydrogen has built up within the storage tank such that a storage pressure of the storage tank is approaching a maximum pressure threshold. Additionally, the systems described herein may determine that the boil-off hydrogen is to be obtained from the storage tank, directed to the backup power system, and the backup power system be activated to consume the boil-off hydrogen and generate power. Due to the activation of the backup power system, the boil-off hydrogen can be utilized to reduce the amount of power received from a power grid or other primary power system while utilizing the hydrogen that would otherwise be wasted. Accordingly, a greater amount of the hydrogen purchased for the backup power system can be utilized and the power costs of a facility can be subsidized via the boil-off hydrogen.

As a result of the techniques described herein, the various systems of the present disclosure can mitigate or prevent hydrogen losses due to natural warming of the storage tank. The natural warming of the storage tank causes stored liquid hydrogen to boil-off into gaseous hydrogen that increases the internal pressure and temperature of the storage tank. Instead of venting the gaseous hydrogen (resulting in the waste of the regularly purchased or generated hydrogen), the boil-off hydrogen can be collected and processed by at least a portion of the power systems that are kept on standby in case a primary power system fails (e.g., a power grid goes down and cannot provide power to a facility). By monitoring the hydrogen via existing systems (e.g., monitoring a state of an economizer valve) and/or storage tank sensors (e.g., pressure sensors, temperature sensors, etc.), a boil-off controller and/or a tank controller can identify built up boil-off hydrogen and cause the boil-off hydrogen to be extracted from the storage tank and provided to the backup power system. As a result, the disclosed systems are able to maintain the hydrogen stored within the storage tank for the backup power source without needlessly venting the boil-off hydrogen to maintain the storage tank at appropriate storage pressures.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

The invention claimed is:

1. A system, comprising:
a storage tank configured to store cryogenic hydrogen in a two-phase mixture;
a liquefaction system configured to receive input hydrogen from an external source and provide the cryogenic hydrogen to the storage tank in a liquid phase;
a backup power system configured to receive cryogenic hydrogen in the liquid phase or in a gaseous phase, wherein the backup power system is configured to be activated when:
a primary power system fails to meet a power demand; or
a boil-off controller determines that a storage pressure of cryogenic hydrogen stored in the storage tank satisfies a pressure threshold associated with the storage tank; and
an economizer valve configured to direct the cryogenic hydrogen from the storage tank and provided to the backup power system, wherein when the backup power system is activated:
the economizer valve is configured to be switched to a first state when a storage pressure within the storage tank is at or exceeds a pressure threshold, wherein the first state of the economizer valve causes the cryogenic hydrogen to be provided to the backup power system in the gaseous phase, and
the economizer valve is configured to be switched to a second state when a storage pressure within the storage tank is below the pressure threshold, wherein the second state of the economizer valve causes the cryogenic hydrogen to be provided to the backup power system in the liquid phase,
the boil-off controller being configured to:
determine whether the storage pressure of the cryogenic hydrogen satisfies the pressure threshold associated with the storage tank,
based on determining that the storage pressure satisfies the maximum pressure threshold, activate the backup power system such that the backup power system consumes boil-off hydrogen received through the boil-off valve,
open a boil-off valve to cause the cryogenic hydrogen in the gaseous phase to be obtained from the storage tank through the boil-off valve if the storage pressure is at or exceeds the second pressure threshold, and
cause the cryogenic hydrogen in the gaseous phase to be directed to the backup power system.

2. The system of claim 1, further comprising:
a boil-off channel that is configured to receive the cryogenic hydrogen in the gaseous phase from the storage tank and direct the cryogenic hydrogen to the backup power system for consumption.

3. The system of claim 1, further comprising a pressure sensor that is associated with the storage tank, the pressure sensor being configured to determine the storage pressure of the cryogenic hydrogen and transmit an indication of the storage pressure to the boil-off controller.

4. The system of claim 3, wherein the pressure sensor is configured to determine the storage pressure of the cryogenic hydrogen based on at least one of a pressure request received from the boil-off controller, a continuous pressure measurement schedule, a periodic pressure measurement schedule, or an aperiodic pressure measurement schedule.

5. The system of claim 1, wherein the boil-off controller is further configured to:
receive, at a first time, a first indication of the storage pressure from a pressure sensor associated with the storage tank;
determine, based at least on the first indication, that the storage pressure exceeds the second pressure threshold;
receive, at a second time after the first time, a second indication of the storage pressure from the pressure sensor;
determine, based at least on the second indication, that the storage pressure is less than an additional pressure threshold;
cause the boil-off valve to close to substantially prevent the cryogenic hydrogen from being provided to the backup power system; and
deactivate the backup power system.

6. The system of claim 5, wherein
the additional pressure threshold comprises a minimum pressure that is determined to prevent backflow into the storage tank.

7. The system of claim 1, wherein the economizer valve is associated with an economizer state sensor that is configured to determine an economizer valve state and transmit an indication of the economizer valve state to the boil-off controller.

8. The system of claim 7, wherein when the backup power system is activated, the boil-off controller is configured to:
receive, at a first time, a first indication that the economizer valve is in the first state;
cause, based at least on the first indication, a flow valve to fluidly connect the storage tank with the backup power system and permit passage of the cryogenic hydrogen in the gaseous phase from the storage tank to the backup power system;
receive, at a second time after the first time, a second indication that the economizer valve is in the second state; and
cause, based at least on the second indication, the flow valve to substantially prevent the passage of the cryogenic hydrogen from the storage tank to the backup power system.

9. The system of claim 8, wherein:
the economizer state sensor is configured to transmit an indication that the economizer valve has switched from the second state to the first state.

10. The system of claim 9, wherein:
the economizer valve is configured to switch to the second state based on an additional determination that the storage pressure is less than an additional pressure threshold, the additional pressure threshold indicating a minimum storage pressure that the storage pressure is to be maintained above; and
the economizer state sensor is configured to transmit an additional indication that the economizer valve has switched from the first state to the second state.

11. The system of claim 8, wherein:
the boil-off controller is configured to operate the flow valve to open a fluid channel that fluidly connects the backup power system with the economizer valve; and
the fluid channel is configured to permit passage of the cryogenic hydrogen from the storage tank, via the economizer valve and the flow valve, to the backup power system.

* * * * *